(12) United States Patent
Fulmer

(10) Patent No.: US 7,266,470 B1
(45) Date of Patent: Sep. 4, 2007

(54) METHOD FOR MITIGATING INTERFERENCE BETWEEN NEARBY PROXIMITY SENSORS

(75) Inventor: John E. Fulmer, Granite Falls, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/623,944

(22) Filed: Jan. 17, 2007

(51) Int. Cl.
*G06F 15/00* (2006.01)

(52) U.S. Cl. .................. 702/150; 702/36; 702/92; 702/94; 702/95; 702/127; 702/152; 702/188; 702/189; 340/540

(58) Field of Classification Search ............... 702/150, 702/136, 92, 94, 95, 127, 188, 189; 340/540; 73/1.79; 324/207.26
See application file for complete search history.

(56) References Cited

U.S. PATENT DOCUMENTS

| | | | |
|---|---|---|---|
| 4,843,259 A | 6/1989 | Weisshaupt | |
| 6,014,022 A | 1/2000 | Demma et al. | |
| 6,025,711 A | 2/2000 | Demma et al. | |
| 6,348,862 B1 | 2/2002 | McDonnell et al. | |
| 6,650,111 B2 * | 11/2003 | Christensen | 324/207.26 |
| 6,920,411 B2 | 7/2005 | Christensen et al. | |
| 2007/0069680 A1 * | 3/2007 | Landry et al. | 318/580 |

* cited by examiner

*Primary Examiner*—Hal Wachsman
*Assistant Examiner*—Phuong Huynh
(74) *Attorney, Agent, or Firm*—John A. Kastelic

(57) ABSTRACT

A method, that arbitrates when each of a plurality of sensors can perform an object detection procedure, assigns a different binary address to each sensor. Each bit in the binary address is sequentially selected. While a bit is selected, every sensor applies a signal to a communication link, which signal has a first or a second logic level as denoted by the value of the selected bit of that sensor's address. Those sensors applying the first logic level to the communication link determine if another sensor is applying the second logic level, in which case those proximity sensors suspend participation in the arbitration method. After all the bits have been selected, only one sensor remains active and that sensor is allowed to perform the object detection procedure. Thereafter, each proximity sensor resumes participation in the arbitration method with a different address and the process is repeated.

20 Claims, 3 Drawing Sheets

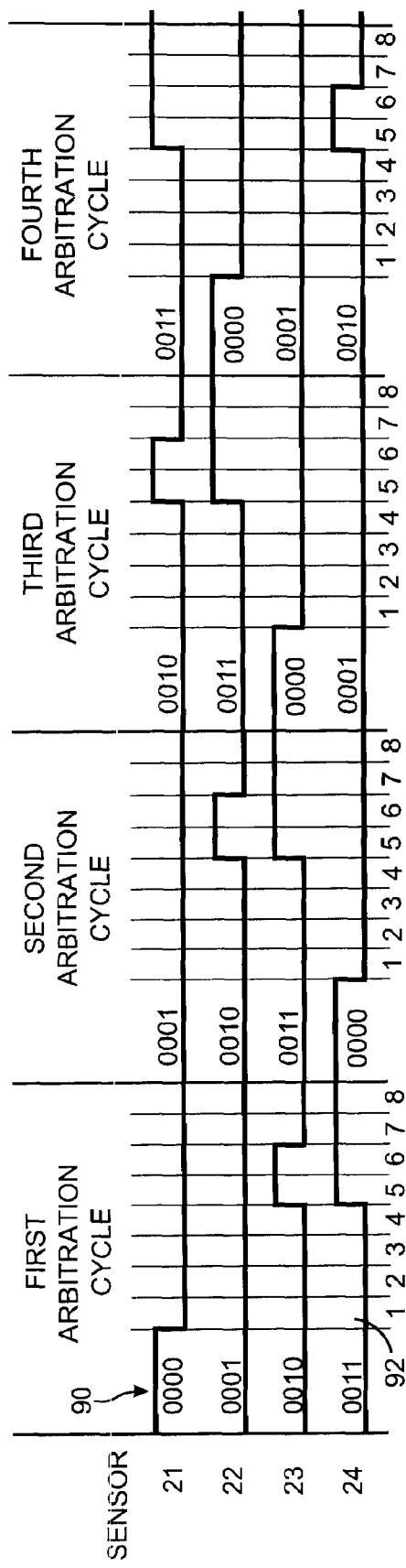
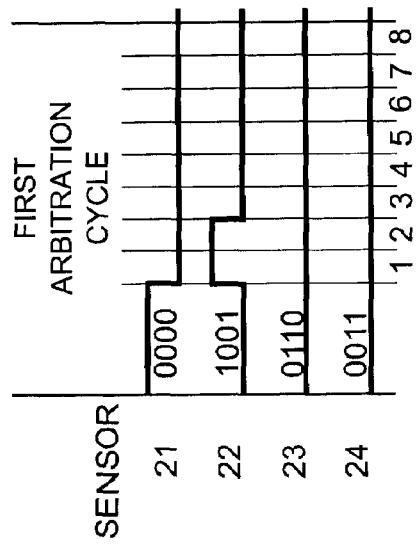
FIG. 4
FIG. 5

METHOD FOR MITIGATING INTERFERENCE BETWEEN NEARBY PROXIMITY SENSORS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to devices, such as inductance type proximity sensors, for detecting the presence of an object, and more particularly to techniques for avoiding one device from interfering with operation of a similar nearby device.

2. Description of the Related Art

Proximity sensors are commonly used along assembly lines to detect the presence of a workpiece passing nearby and then activate equipment that performs manufacturing operations on the detected workpiece.

One common type of sensor has a transducer coil connected to a tuning capacitor to form a resonant circuit of a free running oscillator. The transducer coil generates an electromagnetic field across the path along which the workpieces travel. As a result of the electromagnetic field, eddy currents form in a conductive workpiece approaching the transducer coil and have a magnitude that is proportional to the magnetic flux lines impinging the workpiece surface. The eddy currents alter the inductance of the transducer coil and the series resistance of the coil and its core. The change in the impedance affects the quality factor Q of the tuned circuit causing the peak-to-peak oscillator voltage to decrease in proportion to the quality factor change. Typically the loading of the transducer coil by a workpiece of ferrous metal causes circuit to stop oscillating. Thus the presence of a metallic object can be determined by monitoring whether the circuit is oscillating.

In many industrial applications, several proximity sensors are placed near to each other. This can result in the electromagnetic field of one sensor interfering with the operation of an adjacent sensor. Such interference is commonly referred to as "cross-talk." A common solution for cross-talk is to use proximity sensors having resonant circuits tuned to oscillate at different frequencies. However, this requires the design and manufacture of numerous models of the same type of sensor with differently tuned circuits.

It is desirable to have a technique that mitigates the effects of crosstalk between proximity sensors without requiring differently tuned circuits.

SUMMARY OF THE INVENTION

A system for detecting presence of an object includes a plurality of sensors. A method is provided to arbitrate when each proximity sensor is allowed to perform an object detection procedure. For that method, a different binary address is assigned to each proximity sensor, wherein each bit of the address denotes either a first logic level or a second logic level.

Every proximity sensor performs a series of steps that comprise selecting a bit of the address for the proximity sensor. Next, each proximity sensor applies a signal to a communication link, wherein the signal has the first logic level or the second logic level denoted by the selected bit of that sensor's address. When a given proximity sensor is applying the first logic level to the arbitration conductor, it determines if another proximity sensor is applying a second logic level to the arbitration conductor, and if so the given proximity sensor enters a dormant state in which it suspends participation in the arbitration method.

Then those proximity sensors that have not entered a dormant state, repeat the series of steps until either all the bits of the address have been selected or a sensor becomes dormant. After all the bits of the address have been selected, one proximity sensor still will be active, that is, will not have suspended participation in the dormant state, and that proximity sensor is permitted to perform the object detection procedure.

Thereafter, in a preferred embodiment of this method, every proximity sensor repeatedly changes its address and performs the arbitration process at least until all the sensors perform the object detection procedure.

BRIEF DESCRIPTION OF THE DRAWINGS

FIG. 4 shows waveforms of signals applied to an arbitration conductor by each of the proximity sensors in an example of the cross-talk mitigation process; and FIG. 5 are waveforms depicting signal levels applied to an arbitration conductor by the plurality of proximity sensors in another example of the cross-talk mitigation process.

DETAILED DESCRIPTION OF THE INVENTION

Figure 1:
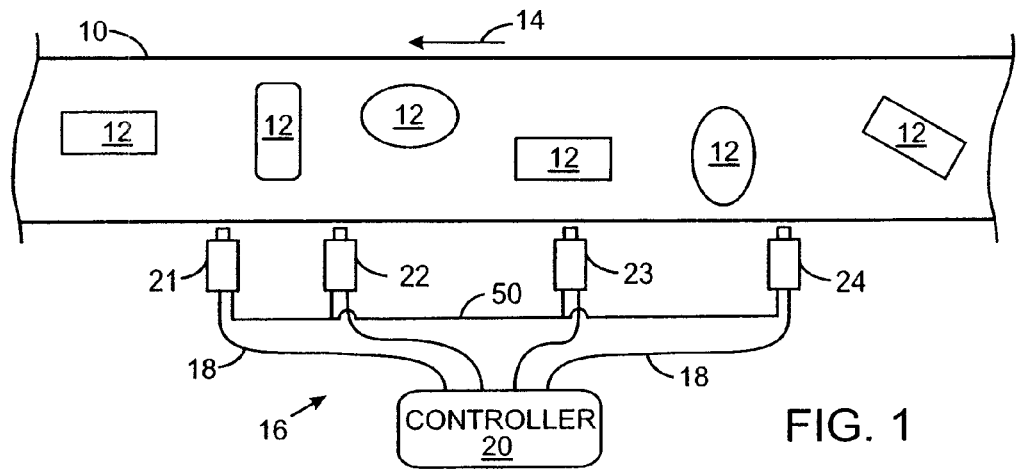
FIG. 1 is schematic diagram of an object detection system that employs a plurality of proximity sensors.

With initial reference to FIG. 1, a conveyor belt 10 carries a plurality of objects 12 in the direction indicated by arrow 14. An object detection system 16 includes four proximity sensors 21, 22, 23 and 24 spaced along one side of the conveyor belt 10. Each proximity sensor 21-24 detects when an object 12 is nearby, in which event the respective sensor produces a positive object detected output signal. That output signal is applied via a cable 18 to a controller 20 of equipment (not shown) that processes the objects.

Figure 2:
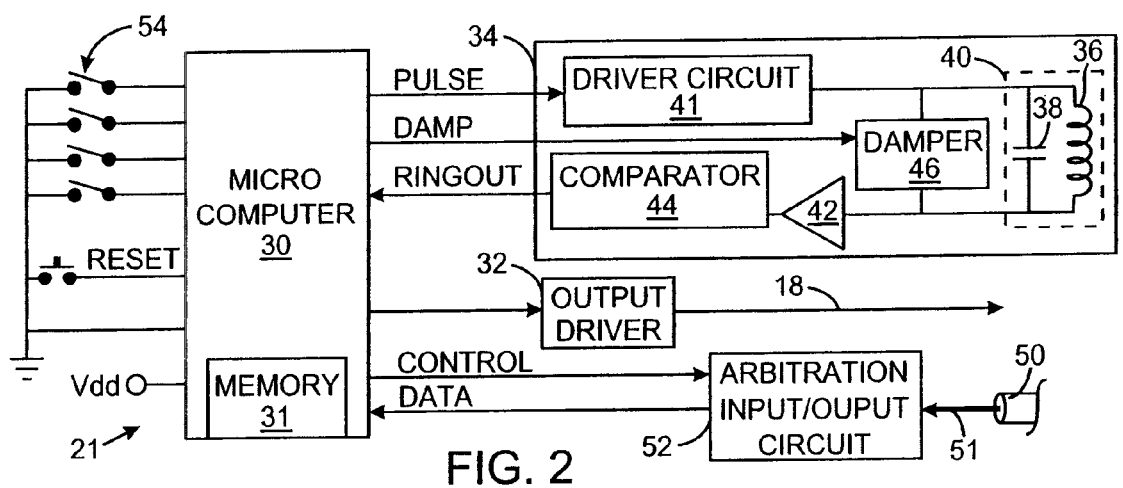
FIG. 2 is a block diagram of the electronic circuit in a proximity sensor.

Each proximity sensor 21-24 may be of the type described in U.S. Pat. No. 6,650,111, which description is incorporated herein by reference. The details of the first proximity sensor 21 are illustrated in FIG. 2 with the understanding that the other proximity sensors 22-24 are constructed and operate in identical manners and the following description is applicable them as well.

The electronic circuitry of the first proximity sensor 21 is built around a conventional microcomputer 30 that contains an internal microprocessor, a memory 31 which stores the software to be executed and data used by that software. Input/output ports of the microcomputer 30 interface the microprocessor to external components. For example, the microcomputer 30 also has a serial output port connected to an output driver 32 which applies a data signal to the cable 18 that provides an indication of whether or not an object has been detected.

The microcomputer 30 also is connected to a transducer circuit 34 that includes a sensor coil 36 connected in parallel with a capacitor 38 to form a resonant circuit 40. The transducer circuit 34 receives a signal, designated PULSE, from the microcomputer 30 and a driver circuit 41 intensifies that signal. The resultant signal at the output of the driver circuit 41 is a series of brief pulses that excite the resonant circuit 40 to oscillate. At the termination of each excitation pulse, the resonant circuit's oscillations decay exponentially at a rate that is a function of the quality factor "Q" of the resonant circuit 40, which in turn is a function of the inductance and capacitance of that resonant circuit. When a metal object 12 is nearby, the inductance of the sensor coil 36 changes by an amount related to the distance between the sensor coil and that object. Thus, the presence or absence of a metallic object, as well as the distance to an object, can be determined by analyzing the characteristics of the exponentially decaying waveform of the oscillating signal in the resonant circuit 40.

That oscillating signal is applied to an input of an amplifier 42 which increases the sensitivity of the proximity sensor. The output of the amplifier 42 is connected to a comparator 44 that compares the output signal to a threshold voltage to discriminate the characteristics of the oscillating signal from the resonant circuit 43. The output of the comparator 44, designated RING OUT, is a series of pulses corresponding in number to the number of oscillation cycles that exceeded the threshold voltage. The microcomputer 30 counts the RING OUT signal pulses which provides a indication of the rate of the exponential signal decay, i.e. the greater the count the longer is the decay.

The microcomputer 30 analyzes that count to determine when an object is on the conveyor in front of the proximity sensor 21. In that case, a true object present signal is sent via the output driver 32 to the controller 20. The microcomputer 30 also may determine the distance to the object and sent a digital indication of that distance to the controller 20.

A damper circuit 46 is connected across the resonant circuit 40 to dampen oscillations during a programming mode of the proximity sensor 21. During that mode, data in the form of magnetic pulses from an external programming device (not shown) induce electrical pulses into the sensor coil 36 and those electrical data pulses are fed through the comparator 44 to the microcomputer 30. At that time the microcomputer 30 activates the damper circuit 46 to inhibit the programming pulses from causing the resonant circuit 40 to oscillate.

As noted previously, when several proximity sensors 21-24 of this type are placed in close proximity to one another along the conveyor belt 10, the electromagnetic field from the sensor coil 36 in one device can interfere with the operation of an adjacent sensor. Such interference, or crosstalk, can lead one or both of those sensors to erroneously determine that an object is present or fail to detect an object that is present. Therefore, the present array of sensors employs a process that mitigates such interference. That process arbitrates among the plurality of proximity sensors 21-24 to determine at any given point in time which one is allowed to perform object detection, while inhibiting detection activity by the other proximity sensors.

With reference to FIGS. 1 and 2, the arbitration process requires that each proximity sensor 21-24 is connected to a common communication link 50 which preferably is an electrical cable having an arbitration conductor 51. Alternatively, the communication link 50 may comprise an optical fiber, a radio frequency link, the power line connected to each sensor, or a similar communication path to carry control signals for the arbitration process. In the preferred embodiment of the mitigation technique the arbitration conductor 51 is separate from the conductors that carry the results of the object detection procedure from the proximity sensor to the controller 20.

The circuitry in each proximity sensor 21-24, as shown in FIG. 2, further comprises an arbitration input/output circuit 52 connected to the communication link 50. The arbitration input/output circuit 52 provides a mechanism for transferring the signal level applied to the communication link 50 to a data input of the microcomputer. In addition, the arbitration input/output circuit 52 selectively applies either a high or a low logic level voltage to the arbitration conductor 51 of communication link 50 in response to a CONTROL signal received from an output of the microcomputer 30.

Figure 3:
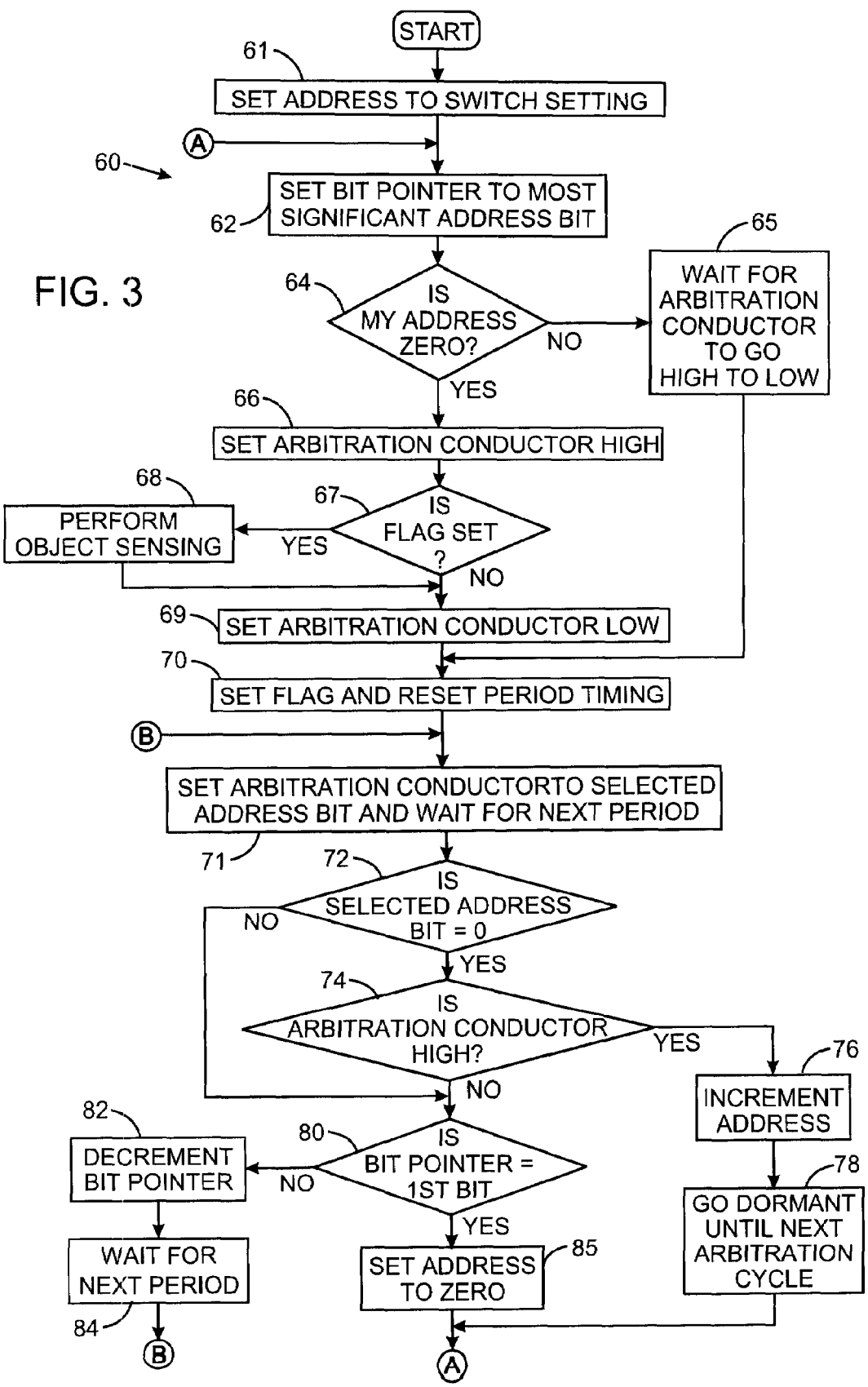
FIG. 3 is a flow chart of a cross-talk mitigation process implemented by software executed in each proximity sensor.

The arbitration process is implemented by identical software programs that are executed in simultaneously by the microcomputer 30 in each proximity sensor 21-24. FIG. 3 is a flowchart depicting the execution of that arbitration software program 60 within one proximity sensor. That execution determines a logic level that each proximity sensor 21-24 applies to the arbitration conductor 51 at various points in time as depicted by the signal waveforms in FIG. 4.

The arbitration program 60 commences at step 61 when the respective proximity sensor 21-24 is powered up. At that time, the microcomputer 30 reads its inputs connected to a set of switches 54 to obtain a binary seed address assigned to that particular proximity sensor. The state of each one of the switches 54 designates the binary value for a different bit of the seed address. The seed address must have a sufficient number of bits so that each proximity sensor 21-24 has a unique binary address. In the exemplary object detection system 16, only two bits are required to accommodate the four proximity sensors 21-24, however the seed address has four bits to enable up to sixteen the proximity sensors to be used in a system. Although one of the proximity sensors 21-24 must be assigned seed address zero (e.g. 0000), the other sensors can be assigned any other address and the addresses do not have to be consecutive binary numbers. As an alternative to utilizing a set of switches 54, the seed address could be programmed into the memory 31 of the microcomputer 30, upon installation on the object detection system 16 for example.

After reading the seed address, the program execution then advances to step 62 where the microcomputer 30 sets a bit pointer to the most significant bit of the address, i.e. the fourth bit. Another bit of the address could be selected at this time, as long as all the proximity sensors select the same bit of their respective address. Then at step 64, each proximity sensor determines whether its address is zero, that designates which particular sensor is considered as the master device in the object detection system 16 at this point in time. At different points in time during the arbitration process, each of the four proximity sensors 21-24 will become the master device, as will be described. For those sensors that do not have the zero address, the program execution branches to step 65 at which they monitor the arbitration conductor 51 by reading the DATA input from their arbitration input/output circuits 52. This monitoring continues until those proximity sensors detect a high to low logic level signal transition on the arbitration conductor 51.

The program execution in the proximity sensor 21, which presently is assigned address zero, branches from step 64 to step 66 where that device applies a high logic level control signal to the arbitration conductor 51. That is accomplished by the microcomputer 30 in that proximity sensor sending an active CONTROL signal to the arbitration input/output circuit 52 which responds by outputting high logic level on the arbitration conductor 51. That high logic level control signal continues during a preliminary interval 90 of a first arbitration cycle in FIG. 4 until specifically terminated by the microcomputer 30. Next at step 67, the zero address proximity sensor, (initially sensor 21) determines whether a flag is set, which is not the case during the first pass through the arbitration program. Therefore in the first pass, the program goes directly to step 69, whereas on subsequent passes the zero address proximity sensor will perform object sensing at step 68 before advancing to step 69. At step 69, the proximity sensor with address zero changes the output from its arbitration input/output circuit 52 to apply a low logic level signal to the arbitration conductor 51, designating to all the other proximity sensors 22-24 that the a preliminary interval 90 has ended.

At this time all the proximity sensor 21-24 advance to step 70 at which they set their respective flags to indicate subsequently that the first pass through the arbitration program has occurred. The remainder of the first arbitration cycle is divided into a plurality of time periods as determined by an internal timer and counter in every microcomputer 30 that indicate transitions between the arbitration cycle periods and a numerical designation of the present period, as will be described. At this juncture that clock timer and counter are reset to the first period in a sequence for the first arbitration cycle. The number of periods in each arbitration cycle is twice the number of bits in the proximity sensor address, i.e. eight periods for the exemplary addresses with four bits.

Then at step 71, each proximity sensor 21-24 applies a logic level signal to the arbitration conductor 51 that corresponds to the value of its address bit that is designated by the bit pointer. For example a "0" address bit value indicates a low logic level, whereas, a "1" address bit value denotes a high logic level. With the present addresses for the proximity sensors 21, 22, 23 and 24 are designated next to the respective the signal waveform in the first arbitration cycle in FIG. 4, the most significant, or fourth, bit pointed to at this juncture is zero for all the sensors. As a consequence, during the first period 92 of the first arbitration cycle, all of the proximity sensors apply a low logic level to the arbitration conductor 51. It should be understood that references herein to high and low logic levels are being described in the context of a positive logic system, whereas the opposite logic levels could be employed to implement the present invention in a negative logic system. The program execution then waits for the next period (i.e. period 2) before advancing, to ensure that the other proximity sensors are applying the proper logic level to the arbitration conductor 51.

Then at step 72, a determination is made by each proximity sensor 21-24 whether its selected address bit is equal to zero and because that is the case for all the proximity sensors at this time, their program execution branches to step 74. Since every proximity sensor is applying a low logic level signal to the arbitration conductor 51 that conductor will not be high and the program execution continues to step 80. Now a determination is made whether the bit pointer is designating the least significant, or first bit, of the address, which occurs when all the address bits have been used by the arbitration process. Since that is not true at this time, the program execution branches to step 82 where the bit pointer in each proximity sensor is decremented to designate the next least most significant bit, at this time the third bit. Then at step 84, the arbitration process waits for the next period in the first arbitration cycle shown in FIG. 4.

At the start of the third period in the first arbitration cycle, the program execution returns to step 71 where each proximity sensor 21-24 applies a logic level signal, corresponding to the value of their third address bit, to the arbitration conductor 51. The program then waits for the fourth period of the first arbitration cycle during which a determination is made at step 72 by each sensor whether its selected address bit is zero. That is true for all the exemplary proximity sensor addresses and thus the program execution again simply decrements the bit pointer at step 82 before waiting at step 84 for the fifth period to commence.

During the fifth period of the first arbitration cycle, the proximity sensors apply a logic level to the arbitration conductor 51 as defined by the second bit in their respective addresses. Therefore, the first and second proximity sensors 21 and 22 apply a low logic level signal to the arbitration conductor 51 as denoted by a zero value for the second bit of their addresses, while the third and fourth proximity sensors 23 and 24 apply a high logic level as their second address bits are a "1". As a consequence when the arbitration programs advance to step 72 at the start of the sixth period, the first and second proximity sensors 21 and 22 determine that their selected address bit equals zero and their programs advance to step 74. At that latter step, the microcomputer 30 in those two proximity sensors inspects the DATA input from the arbitration input/output circuit 52 indicating the signal level on the arbitration conductor 51. The first and second proximity sensors 21 and 22 will see that the arbitration conductor 51 is at a high logic level due to the signals applied by both the third and fourth proximity sensors 23 and 24. Thus, the first and second proximity sensors 21 and 22 branch to step 76 where their respective addresses are incremented by one, before waiting for the second arbitration cycle at step 78. While waiting for the next arbitration cycle, the microcomputers 30 in the first and second proximity sensors 21 and 22 continue to count arbitration cycle periods in order to determine when the eighth and final period has ended. Therefore, during the sixth period of the first arbitration cycle, the first and second proximity sensors 21 and 22 enter a dormant state in which their participation in the arbitration process is suspended until the next arbitration cycle.

During the sixth period, both the third and fourth proximity sensors 23 and 24 determine at step 72 that their second address bit does not equal zero and thus their arbitration programs bypass step 74 by jumping to step 80 and on to step 82. At that latter step, the bit pointer now is decremented to designate the first, or least significant, bit of the address for each sensor. Thereafter at the commencement of the seventh period in the first arbitration cycle, the first and second proximity sensors 21 and 22 are applying a low logic level to the arbitration conductor 51, because they are in the dormant state. At the same time, the third proximity sensor 23 determines that its first address bit has a zero value so that it also applies a low logic level to the arbitration conductor 51. However, the fourth proximity sensor 24 has a first address bit with a value of one, causing it to apply a high logic level to the arbitration conductor. As a result in the eighth period, the execution of the arbitration program in the third proximity sensor 23 determines at step 72 that its selected address bit equals zero and advances to step 74 where it senses that the arbitration conductor 51 is at a high logic level. This causes the third proximity sensor 23 to become dormant and suspend further execution of the arbitration method by branching to steps 76 and 78 to await the second arbitration cycle.

However during the eighth period, the fourth proximity sensor 24 concludes that its selected address bit has a value of one, thereby jumping from step 72 to step 80. Here the fourth proximity sensor 24 determines that the bit pointer is designating the first address bit which causes its program execution to branch to step 85, where the address of the fourth proximity sensor is set to zero. Then the program execution by the fourth proximity sensor 24 returns to step 62 where the arbitration process repeats with the fourth proximity sensor assuming the role of the master device because it now has an address of zero. Note that the addresses of the other proximity sensors 21-23 waiting at step 76 were previously incremented to non-zero values at step 76. Although each address for those other sensors is incremented by one from one arbitration cycle to the next, alternatively the addresses could be decremented with the address "1111" designating the master device.

During the second arbitration cycle depicted in FIG. 4, the addresses of the four proximity sensors 21-24 have been changed to the values indicated adjacent their associated waveform in the second arbitration cycle. Because the fourth proximity sensor 24 now has address zero, it performs object sensing by executing step 68 in the second arbitration cycle while the other sensors wait at step 65. The arbitration process executed by each of the proximity sensors 21-24 during the second arbitration cycle is similar to that described during the first arbitration cycle, except that now during the sixth period the second and third proximity sensors 22 and 23, with second address bits of one, assert high logic level signals on the arbitration conductor 51. Because the second and fourth proximity sensors 21 and 24 now have zero second address bits, they enter the dormant state by branching to step 76 from step 74. They remain in the dormant state until the third arbitration cycle.

During the eighth period in the second arbitration cycle, the third proximity sensor 23, with a first address bit that is a one, applies high logic level signal to the arbitration conductor 51. Because the second proximity sensor 22 has a zero first address bit, it enters the dormant state and suspends participation in the arbitration process until the third arbitration cycle. Thus at the end of the second arbitration cycle, only the third proximity sensor 23 remains participating, thereby winning the arbitration process. As a consequence, the third proximity sensor 23 assumes the zero address and will perform object sensing at the beginning of the third arbitration cycle.

During the third arbitration cycle, the respective addresses of the four sensors 21-24 have been incremented again with the third proximity sensor 23 becoming the master device with an address of all zeros. In the sixth period of the third arbitration cycle, the third and fourth proximity sensors 23 and 24 enter the dormant state until the fourth arbitration cycle, because they have second address bits with a zero value. The first and second proximity sensors 21 and 22 in that period have a "1" second address bit and thus continue participating. During the eighth period of the third arbitration cycle, the first proximity sensor 21 becomes dormant due to having a zero first address bit. Therefore the second proximity sensor 22 now wins the arbitration process and will be able to perform object sensing at the beginning of the fourth arbitration cycle.

For the fourth arbitration cycle, the four proximity sensors 21-24 have again changed their addresses to the particular values designated at the commencement of that arbitration cycle. Now, during either the sixth or the eighth period, the second, third and fourth proximity sensors 22-24 suspend further participation in the arbitration process in a dormant state, resulting in the first proximity sensor 21 being the winner and able to perform object sensing during the next arbitration cycle.

At the completion of the fourth arbitration cycle in FIG. 4, the first sensor 21, which was the last device to win the arbitration, will again assume the role of the master device as having its address set to all zeros. In each of the four arbitration cycles, a different one of the four proximity sensors 21-24 wins the arbitration and is allowed to perform object sensing. The arbitration process repeats from the beginning of the diagram of FIG. 4, as the four proximity sensors 21-24 now have the same addresses as designated in the first arbitration cycle. The number of arbitration cycles that occur before the process repeats corresponds to the number of active proximity sensors connected to the arbitration conductor 51.

Although the prior example of the arbitration process had consecutive seed address numbers assigned to each of the four sensors that does not necessarily have to be the case as indicated in FIG. 5. Although one of the proximity sensors, e.g. the first sensor 21, must be assigned a seed address of all zeros, the remaining devices can have any other address assigned to them as long as each one has a different address. With this set of seed addresses indicated by each sensor's waveform, the second proximity 22 sensor applies a high logic level signal to the arbitration conductor 51 during the second period of the depicted arbitration cycle. At that time, because the fourth address bits for the other proximity sensors 21, 23, and 24 are zero, they exert low logic level signals to the arbitration conductor 51. As a consequence in the second arbitration cycle period, the first, third and fourth proximity sensors 21, 23, and 24 suspend further participation in the arbitration process in the dormant state and the second proximity sensor 22 wins being allowed to perform object sensing. Therefore, depending upon the particular set of addresses assigned to each of the four proximity sensors 21-24, the winner of the arbitration process may be determined long before the eighth period in the example of FIG. 4. In fact, depending upon the particular assignment of addresses, the winner of the arbitration process can be determined in any on of the second, fourth, sixth, or eighth periods.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. In a system having a plurality of proximity sensors for detecting presence of an object, a method for arbitrating when an proximity sensor is allowed to perform an object detection procedure, said method comprising:

assigning a different binary address to each proximity sensor, wherein each bit of the address denotes either a first logic level or a second logic level;

each given proximity sensor performing a series of steps comprising:

(a) selecting a bit of the address for the given proximity sensor thereby designating a selected bit;

(b) applying a signal to a communication link, wherein the signal has the first logic level or the second logic level denoted by the selected bit of the given proximity sensor address, (c) determining if another proximity sensor is applying a first logic level to the communication link when the given proximity sensor is applying the second logic level to the communication link, and if so the given proximity sensor enters a dormant state in which participation in the method for arbitrating is suspended;

(d) if the given proximity sensor is not in the dormant state, repeating steps (a) through (c) until either all bits of the address have been selected or the given proximity sensor enters the dormant state; and (e) thereafter, if the given proximity is not in the dormant state, the given proximity sensor sensing whether an object is present.

2. The method as recited in claim 1 wherein assigning a different address to every proximity sensor assigns one of the proximity sensors an address in which all the bits denote an identical logic level.

3. The method as recited in claim 1 further comprising each proximity sensor changing its address, and then repeating the series of steps.

4. The method as recited in claim 1 wherein an address assigned to one of the proximity sensors is designated as a master address.

5. The method as recited in claim 4 further comprising upon commencing to perform the series of steps; each proximity sensor:

determining whether its address is the master address;
if so, then applying a control signal to the communication link; and
if not, awaiting for termination of the control signal on the communication link.

6. The method as recited in claim 4 further comprising each proximity sensor changing its address, wherein one proximity sensor changes its address to the master address; and then repeating the series of steps.

7. In a system having a plurality of proximity sensors for detecting presence of an object, a method for arbitrating when each proximity sensor is allowed to perform an object detection procedure, said method comprising:

assigning a different address to each proximity sensor wherein the each address has a same plurality of bits with each bit denoting either a first logic level or a second logic level;
connecting each proximity sensor to an arbitration conductor;
each given proximity sensor performing an arbitration cycle comprising steps of:

(a) selecting one of the plurality of bits thereby designating a selected bit;
(b) applying, to the arbitration conductor, the first logic level or the second logic level as denoted by the selected bit of the given proximity sensor's address;
(c) when the given proximity sensor is applying the first logic level to the arbitration conductor, determining if another proximity sensor is applying a second logic level to the arbitration conductor, and if so the given proximity sensor becomes dormant for a remainder of the arbitration cycle;
(d) if the given proximity sensor is not dormant, repeating steps (a) through (c) until either all the bits of the address have been selected or the given proximity sensor becomes dormant;

(e) thereafter, if the given proximity sensor is not dormant, the given proximity sensor performing an object detection procedure; and
(f) commencing another arbitration cycle in which every one of the plurality of proximity sensors has a different address than was assigned to the respective proximity sensor during an immediately preceding arbitration cycle.

8. The method as recited in claim 7 wherein an address assigned to one of the proximity sensors is designated as a master address.

9. The method as recited in claim 8 wherein all the bits of the master address denote an identical logic level.

10. The method as recited in claim 8 further comprising upon commencing each arbitration cycle, each proximity sensor:

determining whether its address is the master address;
if so, then applying a control signal to the arbitration conductor; and
if not, awaiting for termination of the control signal on the arbitration conductor.

11. The method as recited in claim 9 wherein while a proximity sensor is applying a control signal to the arbitration conductor that proximity sensor performs the object detection procedure.

12. The method as recited in claim 8 further comprising prior to commencing another arbitration cycle, the plurality of proximity sensors change their addresses, wherein the given proximity sensor, that is not dormant when step (e) is performed, takes on the master address.

13. The method as recited in claim 7 further comprising prior to commencing another arbitration cycle, the plurality of proximity sensors change their addresses.

14. The method as recited in claim 7 wherein each arbitration cycle is divided into a plurality of periods and in which one of the plurality of bits is selected during each period; and during each period each proximity sensor applies the first logic level or the second logic level as denoted by the bit which is selected.

15. The method as recited in claim 7 wherein each arbitration cycle is divided into a plurality of periods in which a different one of the plurality of bits is selected during each pair of consecutive periods, and during each pair of consecutive periods each proximity sensor applies the first logic level or the second logic level as denoted by the bit that is selected.

16. The method as recited in claim 15 wherein step (c) is performed during a second occurring period in each pair of consecutive periods.

17. In a system having a plurality of proximity sensors for detecting presence of an object, a method for arbitrating when each proximity sensor is able to perform an object detection procedure, said method comprising:

assigning a different address to each proximity sensor wherein the each address has a same plurality of bits with each bit denoting either a first logic level or a second logic level;

(a) sequentially selecting one of the plurality of bits in the address of each proximity sensor;
(b) while the one of the plurality of bits is selected:
(1) each proximity sensor applying a signal to a communication link, wherein the signal has the first logic level or the second logic level denoted by the selected bit, and
(2) those proximity sensors, applying the first logic level to the communication link, determining if another proximity sensor is applying the second logic level to the communication link, in which case those proximity sensors enter a dormant state in which participation in the method for arbitrating is suspended;

(c) after steps (1) and (2) have been performed for every bit of the address, any proximity sensor that is not in the dormant state, performs the object detection procedure;

(d) then each proximity sensor resuming participation in the method for arbitrating with a different address; and (e) repeating steps (a) through (d) at least until all the plurality of proximity sensors have performed the object detection procedure.

18. The method as recited in claim 17 wherein assigning a different address to every proximity sensor assigns one of the proximity sensors an address in which all the bits denote an identical logic level.

19. The method as recited in claim 17 wherein an address assigned to one proximity sensor is designated a master address and further comprising prior to performing step (b); each proximity sensor:

determining whether its address is the master address;

if so, then applying a control signal to the communication link; and if not, awaiting for termination of the control signal on the communication link.

20. The method as recited in claim 19 wherein when each proximity sensor changes its address, one proximity sensor changes its address to the master address.

* * * * *